Dec. 26, 1944.　　　W. F. F. MARTIN-HURST　　　2,366,146
AIR SUPPLY SYSTEM FOR AIRCRAFT FUEL TANKS AND VALVES FOR USE THEREIN
Filed March 12, 1942　　　3 Sheets-Sheet 1

INVENTOR
William Frederick Forrest Martin-Hurst.
By Navan L Bateman
ATTORNEYS

Dec. 26, 1944.  W. F. F. MARTIN-HURST  2,366,146
AIR SUPPLY SYSTEM FOR AIRCRAFT FUEL TANKS AND VALVES FOR USE THEREIN
Filed March 12, 1942   3 Sheets-Sheet 2

INVENTOR
William Frederick Forrest Martin-Hurst.
By Norris & Bateman
ATTORNEYS

Dec. 26, 1944. W. F. F. MARTIN-HURST 2,366,146
AIR SUPPLY SYSTEM FOR AIRCRAFT FUEL TANKS AND VALVES FOR USE THEREIN
Filed March 12, 1942 3 Sheets-Sheet 3

INVENTOR
William Frederick Forrest Martin-Hurst,
By
ATTORNEYS

Patented Dec. 26, 1944

2,366,146

UNITED STATES PATENT OFFICE 2,366,146

AIR SUPPLY SYSTEM FOR AIRCRAFT FUEL TANKS AND VALVE FOR USE THEREIN

William Frederick Forrest Martin-Hurst, Sunbury-on-Thames, England

Application March 12, 1942, Serial No. 434,434
In Great Britain December 23, 1940

10 Claims. (Cl. 277—45)

This invention relates to air supply systems and to control valves for use therein and has particular reference to systems employed for supplying air to the fuel tanks of aircraft to replace the fuel withdrawn from such tanks by the fuel pump.

In aircraft which fly at great altitudes there is a tendency for the fuel to vaporise and to decrease the effective capacity of the fuel pump and one method of overcoming this difficulty is to apply air under pressure to the fuel tanks.

The object of the present invention is to provide improvements in air supply systems of the kind above described to enable the pressure in a fuel tank to be atmospheric until the aircraft has reached a certain altitude but as the altitude is increased to cause pressure to be gradually built up within the fuel tanks, to enable the maximum pressure to be limited and in case of possible failure of the air supply to make provision automatically for air to enter the fuel tanks.

The present invention provides a novel control valve adapted for use in an air supply system for the fuel tank of an aircraft employing a pump adapted to deliver air to the fuel tank to replace fuel withdrawn by the fuel pump, the valve through which the pump delivery communicates with atmosphere being responsive to changes of atmospheric pressure to increase the supply of air under pressure to the tank as the altitude of the aircraft increases.

The invention also provides a valve adapted for use in such an air supply system comprising an expansible capsule responsive to atmospheric pressure variations, a valve member operated by said capsule adapted in its closed position to prevent escape of air to atmosphere and a safety valve member for relieving excess pressure in the system.

Reference will now be made to the accompanying drawings in which.

Figure 1:
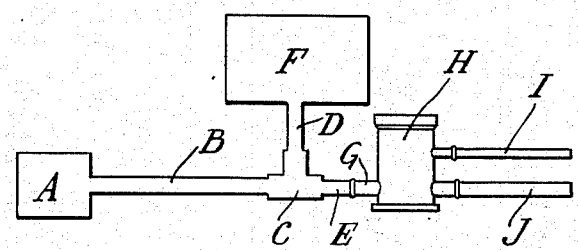
Fig. 1 is a diagram showing an air supply system according to the invention.

In the drawings, and referring first to Fig. 1, A indicates a pump of any standard form for use on aircraft which supplies air under pressure through a conduit B connected by a T-piece C with conduits D and E leading respectively to a fuel tank F and to the inlet G of a valve casing H having two outlets I and J hereinafter described.

Figure 2:
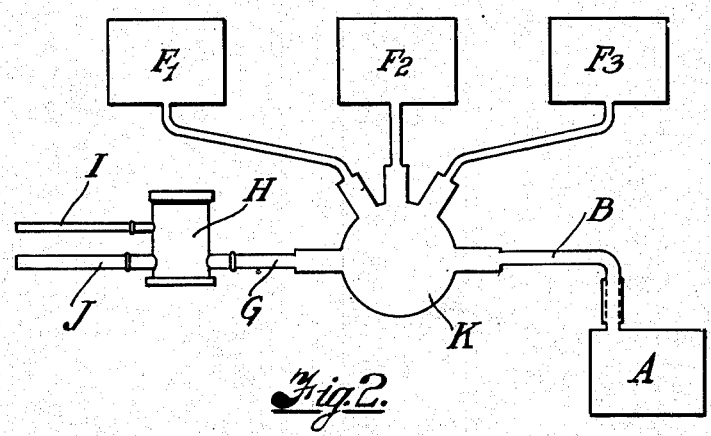
Fig. 2 is a diagram showing the application of the invention to a number of fuel tanks.

In the arrangement shown in Fig. 2 parts similar to those shown in Fig. 1 are indicated by the same reference letters but instead of the T-piece C, a header K is employed which is connected by conduits with fuel tanks $F^1$, $F^2$, and $F^3$.

Figure 4:
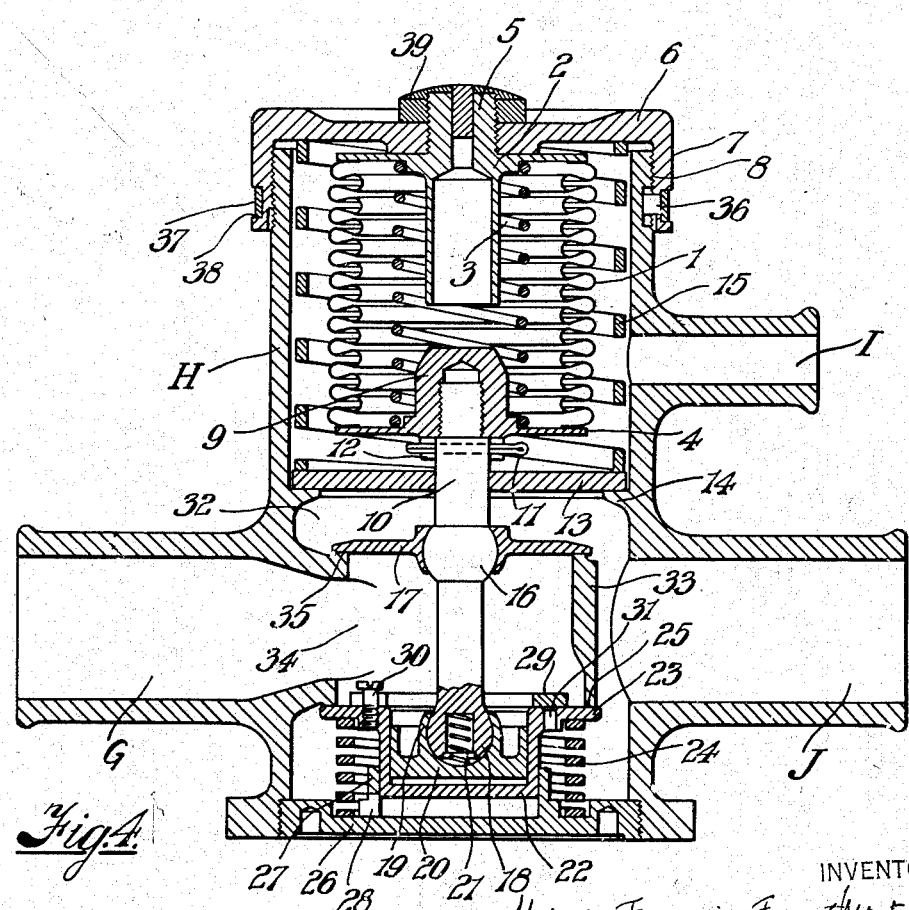
Fig. 4 is a sectional elevation similar to Fig. 3 but with the parts in positions occupied at high altitudes.
Figure 3:
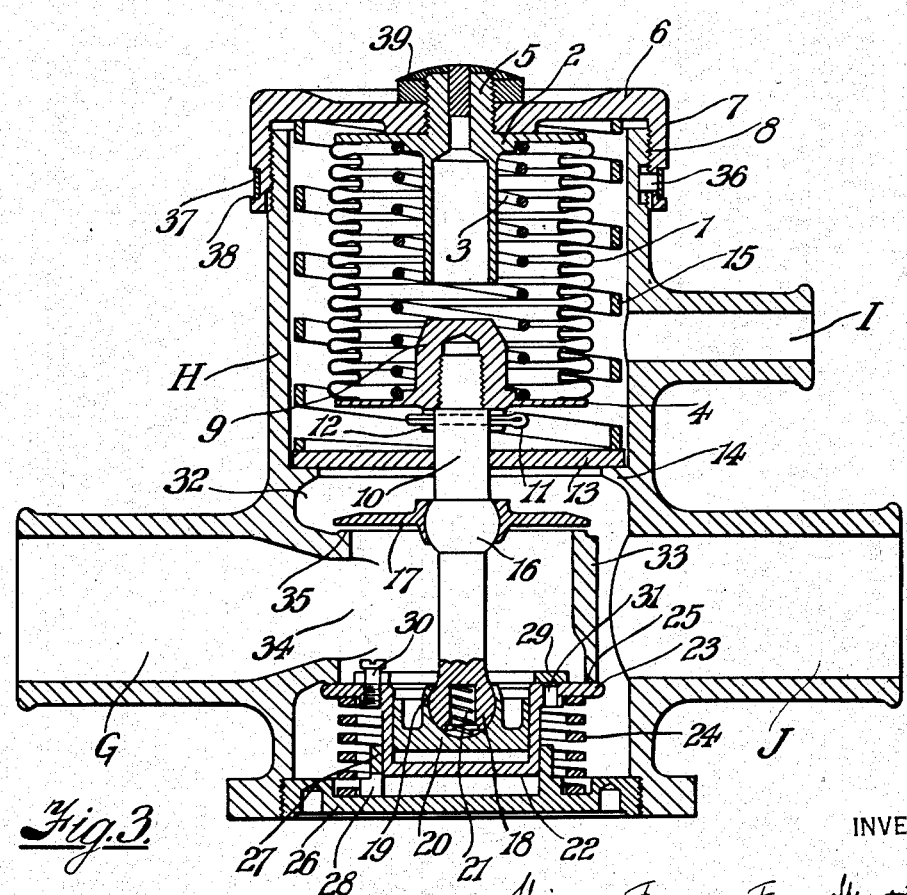
Fig. 3 is a sectional elevation of the control valve for the systems shown in Figs. 1 and 2.
Figure 5:
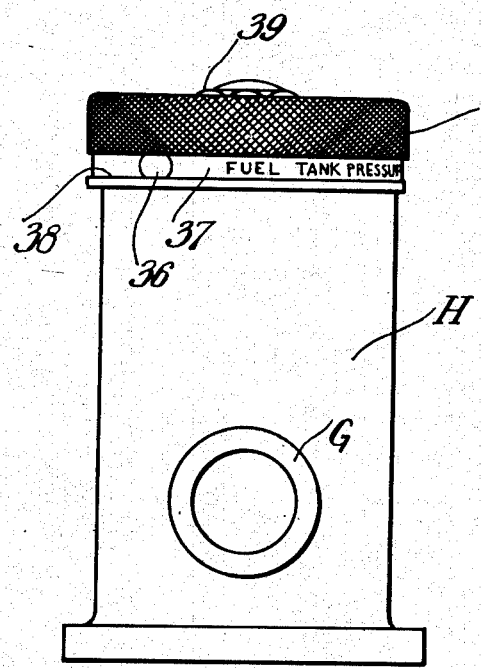
Fig. 5 is an outside elevation of the valve shown in Figs. 3 and 4 but drawn to a smaller scale and Fig. 6 is a plan of the valve.
Figure 6:
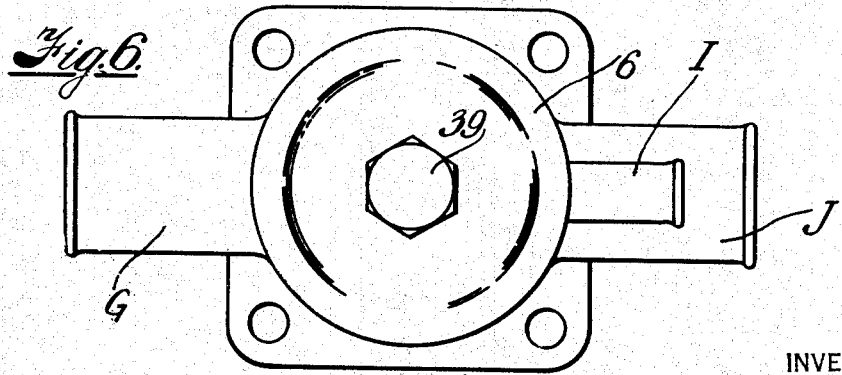

The control valve H shown in Figs. 1 and 2 is illustrated in detail in Figs. 3 and 4 and comprises a casing in the upper part of which is mounted an evacuated capsule comprising a metallic bellows 1, upper bellows plate 2 internal spring 3 and lower bellows plate 4. The upper bellows plate 2 has a central screw threaded boss 5 which is engaged by and locked in an adustment cap 6 having a knurled rim 7 to facilitate manual operation and an internal screw threaded portion 8 adapted to engage over the upper end of the casing H. The lower bellows plate 4 also has an internally screw threaded boss 9 into which is screwed a spindle 10 locked in position by a split pin 11 which passes through an aperture in the said spindle and engages serrations 12 depending from the bellows plate 4.

The interior of that portion of the casing H which houses the bellows 1 is in permanent communication with the atmosphere through the passage I and its base is closed by a baffle plate 13 through which the valve spindle 10 freely passes, the said baffle plate being held down against an annular shoulder 14 in the casing by a spring 15 whose upper end bears against the inner surface of the cap 6. The baffle plate 13 is not intended to move in a direction axially of the spindle 10 but is made as a separate component for convenience in assembly and also, being of lesser diameter than the interior of the casing, to accommodate itself laterally to any slight axial deviation of the spindle 10.

Attached to a spherically turned portion 16 of the spindle 10 is a valve disc 17, the central bore of which is rolled over the spherical portion 16 of the spindle during manufacture to provide a slightly universal and substantially leak proof mounting for the valve disc on the spindle. The lower portion of the valve stem terminates in a spherical portion 18 to which is attached, by means of a partially universal joint at 19, a piston 20. The interior of the lower end of spindle 10 is hollow and houses a light spring 21 which takes up any end play between the piston 20 and spindle 10. The piston 20 is movably mounted within a safety valve 22 which is of cylindrical form, closed at its lower end and having a flanged rim 23 around its upper edge which rim is pressed by a spring 24 against an annular seating 25 formed within the lower portion of valve casing H. The mounting of the piston 20 within the cylindrical safety valve 22 forms a dashpot for the lower end of spindle 10 which operates to prevent sudden oscillatory movements of the valve 17 which would fatigue the bellows 1 and destroy the efficiency of the apparatus.

The base of the casing is closed by a cover plate 26 on the inner side of which is formed a cylindrical socket 27 within which the safety valve 22 is movable, the base of this socket having a hole or holes 28 for passage of air to prevent the formation of an air cushion below the safety valve. The lower end of spring 24 finds an abutment on the inner surface of the plate 26.

On the upper face of the safety valve 22 is mounted a vacuum valve consisting of a loose ring 29 guided and attached to the said safety valve by two shouldered screws or rivets 30. There is communication from one side to the other of the safety valve through holes 31 which are normally closed by the valve ring 29 but which, under certain conditions of pressure as hereinafter described, are opened by the upward movement of the valve ring 29.

The inlet G and outlet J of the casing H both communicate with a chamber 32 in the lower portion of said casing within which is a cylindrical baffle 33 having an opening 34 in constant communication with the inlet G. The upper and lower edges of the said baffle form respectively a seating 35 for the valve disc 17 and the seating 25 for the valve 22. When both valves are closed communication between inlet G and outlet J is cut off.

To effect the initial setting of the position of the valve 17 relatively to its seating 35 the cap 6 is rotated on the casing H and after the adjustment is complete, a small pin 36 is passed through a hole in the cap 6 into engagement with a recess formed in the exterior of the casing. The pin 36 is retained in position by a metallic band 37 which lies in a groove 38 in the rim 7 of cap 6, the ends of this band being fixed together and to the head of the pin 36 by soldering. To prevent tampering with the device after it has been set a factory seal can be applied to the soldered joint of the band 37 and also to another soldered joint over a nut 39 which locks the boss 5 of the upper bellows plate to the cap 6. In this manner the adjustment of the barometric portion of the valve cannot be disturbed without breaking one or other of the seals.

The operation of the arrangements above described is as follows:

At ground level and until the aircraft attains a certain predetermined altitude, the valve 17 is off its seat 35, as shown in Fig. 3, owing to the load due to atmospheric pressure acting on the exterior of the bellows 1 exceeding the combined strength of the spring 3 and the bellows.

Air entering through the inlet G thus passes directly through the chamber 32 and outlet J to atmosphere.

As the aircraft rises and the atmospheric pressure diminishes, the bellows 1 and its spring 3 are enabled to expand and cause the valve 17 to move gradually towards its closed position on its seat 35 (see Fig. 4) whereby the valve tends to maintain a pressure in the system connected to inlet G so that the fuel tank F or tanks $F^1$, $F^2$ and $F^3$ are under a pressure greater than atmospheric.

The higher the aircraft rises, the greater will be the pressure above prevailing atmosphere maintained in the said system until such pressure is great enough to overcome the resistance of spring 24 and force the safety valve 22 off its seat 25, after which further pressure rise is negligible, the excess air being able to pass between the valve 22 and its seating into chamber 32 and escape to atmosphere through outlet J.

As it is essential for the proper operation of the system, that the pressure surrounding the bellows 1 shall be atmospheric pressure, the baffle 13 is provided to prevent the air as it rushes past the seat 35 from causing a false pressure around the bellows. For this reason also the vent I is provided which, being connected to atmosphere independently of the outlet J, ensures that the space surrounding the bellows remains at true atmospheric pressure.

In the event of the air supply failing when the aircraft is at a great altitude, both the valve 17 and safety valve 22 would be closed. The engine pump would continue, however, to draw fuel from the tank or tanks and cause the vacuum valve 29 to lift and allow air to flow back from passage J, between valves 29 and 22 by way of ports 31 and through port 34 to passage G and thereafter to enter the fuel tank or tanks to replace the fuel removed. No spring is necessary in valve 29 since its lift is very limited and in all normal circumstances the positive pressure exerted by the pump tends to hold this valve on its seat.

I claim:

1. A valve for use in an air supply system for the fuel tank of an aircraft, comprising a housing, an expansible metallic bellows disposed in one compartment of said housing which is in permanent communication with atmosphere, a spindle operated by said bellows and extending into another compartment of said housing having an inlet adapted for connection to the fuel tank and an outlet connected to atmosphere, a valve member carried by said spindle controlling the flow of air between said inlet and outlet, a piston carried by the end of said spindle and mounted in a dashpot cylinder constituting a safety valve, a spring normally maintaining said safety valve closed and a vacuum valve mounted above said safety valve.

2. A valve for use in an air supply system for the fuel tank of an aircraft, comprising an expansible capsule responsive to atmospheric pressure variations, a valve member operated by said capsule and adapted in its closed position to prevent escape of air from the system to atmosphere, a safety valve member for relieving excess pressure in the system, and a stem slidably connecting and coaxially guiding said valve members.

3. A valve for use in an air supply system for the fuel tank of an aircraft, comprising a casing, an expansible capsule disposed in a compartment of said casing in permanent communication with atmosphere, a valve member operated by said capsule and adapted to control and cut off communication between the tank and atmosphere, and a second valve member slidably connected to said first valve member and operable as a safety valve when said first valve member is closed to relieve excess pressure in said air supply system.

4. A valve for use in an air supply system for the fuel tank of an aircraft, comprising a casing, an expansible capsule responsive to atmospheric pressure variations disposed in said casing, a valve member operated by said capsule, a safety valve to relieve excess pressure, a motion-damping connection between said valve member and safety valve, and a vacuum valve to admit air to the said system when the capsule operated valve and the safety valve are closed.

5. A valve for use in an air supply system for the fuel tank of an aircraft, comprising a casing, a capsule responsive to atmospheric pressure variations disposed in a compartment of said casing in permanent communication with atmosphere, a valve member disposed in a valve chamber in said casing and operated by said capsule, said valve chamber adapted to be connected to the tank and to atmosphere, a safety valve opened automatically to relieve excess pressure when said valve member is closed, and means connecting said valve member and safety valve for damping the movements thereof.

6. A valve for use in an air supply system for the fuel tank of an aircraft, comprising a casing, an expansible capsule responsive to atmospheric pressure variations disposed in said casing, a spindle operated by said capsule and carrying a disc valve member and a piston, a cylinder constituting a safety valve to relieve excess pressure, said piston being movable in said cylinder to act as a dash pot to cushion the movements of said spindle and prevent oscillation thereof, and a vacuum valve to admit air to the system when the capsule operated valve member and the safety valve are closed.

7. A valve for use in an air supply system for the fuel tank of an aircraft, comprising a casing having a cylindrical baffle therein and an inlet to said baffle, an expansible capsule responsive to atmospheric pressure variations disposed in said casing, a valve member operated by said capsule, a safety valve to relieve excess pressure, said safety valve having a flange thereon, said baffle having upper and lower edges which form seats for said valve member and the flange on the safety valve, a spring for normally retaining the flange on the safety valve on its seat, and a vacuum valve to admit air to the system when the capsule operated valve member and safety valve are closed.

8. A valve for use in an air supply system for the fuel tank of an aircraft, comprising a casing having a cylindrical baffle therein and an inlet communicating with the interior of said baffle, an expansible capsule responsive to atmospheric pressure variations disposed in said casing, a valve member operated by said capsule, a safety valve to relieve excess pressure, said safety valve having air inlet ports therein, said baffle having annular edges forming seats for said valve member and safety valve respectively, and a ring loosely attached to the safety valve and adapted to seat thereon to control the inlet ports therein, said ring being normally held on its seat on the safety valve by the pressure within the baffle but lifted therefrom by failure of the air supply.

9. A valve for use in an air supply system for the fuel tank of an aircraft, comprising a casing, an expansible capsule therein responsive to atmospheric pressure variations, a spindle operated by said capsule, a valve member operable by said spindle, a cylinder constituting a safety valve to relieve excess pressure, a piston operable by said spindle and movable in said cylinder, said spindle having connections with said valve member and piston which permit self adjustment thereof relatively to the spindle, a spring housed in an end of said spindle to take up end play between the piston and spindle, and a vacuum valve to admit air to the system when the capsule operated valve member and safety valve are closed.

10. A valve for use in an air supply system for the fuel tank of an aircraft, comprising a casing having a baffle plate seated therein and forming a valve chamber and a compartment separated therefrom, a capsule disposed within said compartment in permanent communication with atmosphere, a valve member disposed in the valve chamber, a safety valve opened automatically to relieve excess pressure when said valve member is closed, said safety valve providing a cylinder having a piston therein, a spindle extending through said baffle plate and connecting said valve member and piston to said capsule for operation thereby, and a spring holding said baffle plate on its seat under all conditions of operation, said baffle plate being capable of slight lateral movement to accommodate it to any inequalities of movement of the spindle.

WILLIAM FREDERICK FORREST MARTIN-HURST.